US007248182B2

(12) United States Patent
Dudda et al.

(10) Patent No.: US 7,248,182 B2
(45) Date of Patent: Jul. 24, 2007

(54) MEASUREMENT SYSTEM HAVING AT LEAST ONE REPLACEABLE SENSOR

(75) Inventors: Olaf Dudda, Goettingen (DE); Christian Oldendorf, Goettingen (DE)

(73) Assignee: Sartorius Aktiengesellschaft, Goettingen (DE)

( * ) Notice: Subject to any disclaimer, the term of this patent is extended or adjusted under 35 U.S.C. 154(b) by 781 days.

(21) Appl. No.: 10/642,204

(22) Filed: Aug. 18, 2003

(65) Prior Publication Data

US 2004/0075578 A1 Apr. 22, 2004

(30) Foreign Application Priority Data

Aug. 16, 2002 (DE) ................................ 102 37 682

(51) Int. Cl.
*G08C 19/22* (2006.01)
*H04Q 9/00* (2006.01)

(52) U.S. Cl. .................... 340/870.07; 600/317; 73/773

(58) Field of Classification Search ........... 340/870.07; 204/400, 403.01, 407, 422; 600/317, 345; 73/773

See application file for complete search history.

(56) References Cited

U.S. PATENT DOCUMENTS 5,833,603 A * 11/1998 Kovacs et al. .............. 600/317
5,969,260 A * 10/1999 Belk et al. .................... 73/773
6,546,268 B1 * 4/2003 Ishikawa et al. ............ 600/345

FOREIGN PATENT DOCUMENTS

DE 195 32 914 A1 3/1997
DE 197 22 744 A1 12/1998
DE 100 24 035 A1 11/2001

* cited by examiner

*Primary Examiner*—Timothy Edwards, Jr.
(74) *Attorney, Agent, or Firm*—Sughrue Mion, PLLC

(57) ABSTRACT

A measurement system having an analyzer unit (2; 102) and at least one replaceable sensor (1; 101). Each sensor has a transponder (13) in which sensor-specific data is stored. The analyzer unit has an antenna (21) for wireless readout of the data stored in the transponder and for wireless transmission of the power required to operate the transponder. The transponder (13) and the antenna of the analyzer unit (2) are further configured to additionally transmit and receive the measurement signal of the sensor (1) wirelessly. The sensor may be accommodated in a connecting unit (32, 52, 62, 72, 112) configured to be secured to a corresponding mating component (41, 56, 66, 76, 116).

12 Claims, 7 Drawing Sheets

12 Electronic Circuit
12' Analog Pre-Amplifier
12" Microprocessor with A/D Converter
12''' Pre-Amplifier
13 Transponder
14 Data Memory
15 Antenna
16 Reception Part

MEASUREMENT SYSTEM HAVING AT LEAST ONE REPLACEABLE SENSOR

The following disclosure is based on German Patent Application No. 102 37 682.4 filed on Aug. 16, 2002, which is incorporated into this application by reference.

FIELD OF AND BACKGROUND OF THE INVENTION

This invention relates to a measurement system having an analyzer unit and at least one replaceable sensor, each sensor having a transponder in which sensor-specific data is stored, and the analyzer unit having an antenna for wireless readout of the data stored in the transponder and for wireless transmission of the power required to operate the transponder.

Sensor-specific data stored in the transponder may include, for example, information on the measurement range, calibration data, the manufacturing date (in the case of aging-sensitive sensors), identification numbers, which prevent inadvertent connection of sensors not approved for use with the analyzer, and similar data.

Measurement systems of this type are known, for example, from German Patent Application 197 22 744 A1, which is incorporated into the present application by reference. In the measurement system described there, the sensor is connected to the analyzer unit by a plug-and-socket connection, which transmits the measurement signal of the sensor to the analyzer unit. The transponder is situated on the sensor in the vicinity of this. plug-and-socket connection, and the antenna is situated on the analyzer unit for readout. However, the plug-and-socket connection is a weak point, in particular when low voltages must be transmitted—e.g., in the case of load cells with wire strain gauges—whereby thermal stresses result in significant errors. Such plug-and-socket and-socket connections are also disadvantageous when the sensors deliver a very high-impedance signal—e.g., pH electrodes—and are therefore susceptible to contact problems and insulation resistance is inadequate. Finally, plug-and-socket connections are preferably avoided also when the sensors are replaced frequently, which increases the risk of wear and breakage.

OBJECTS OF THE INVENTION

An object of the invention is to improve upon a measurement system of the type defined above. A further object is to provide a measurement system in which the sensors can be replaced easily while nevertheless ensuring reliable transmission of the measurement signal.

SUMMARY OF THE INVENTION

According to one formulation, the invention is directed to a measurement system that includes an analyzer unit and at least one replaceable sensor. Each sensor has a transponder in which sensor-specific data is stored. The analyzer unit has an antenna for wireless readout of the data stored in the transponder and for wireless transmission of power required to operate the transponder. A measurement signal of the sensor is transmitted by wireless transmission via the transponder to the antenna of the analyzer unit Transmission of the measurement signal of the sensor via the transponder to the antenna of the analyzer unit by wireless transmission is a marked improvement over the prior art. This completely eliminates the electric plug-and-socket connection between the sensor and the analyzer unit. Moreover, both the measurement signals and the sensor-specific data are transmitted from the transponder on the sensor to the antenna on the analyzer unit by wireless transmission. By utilizing the inventive arrangement, it is necessary only to provide suitable mechanical means to ensure that the transponder on the sensor remains within the field range of the antenna on the analyzer unit.

Advantageous embodiments are described below and constitute additional formulations of the invention overall.

BRIEF DESCRIPTION OF THE DRAWINGS

This invention and embodiments thereof are described in greater detail below with reference to the schematic figures, which show.

DETAILED DESCRIPTION OF THE PREFERRED EMBODIMENTS

Figure 1:
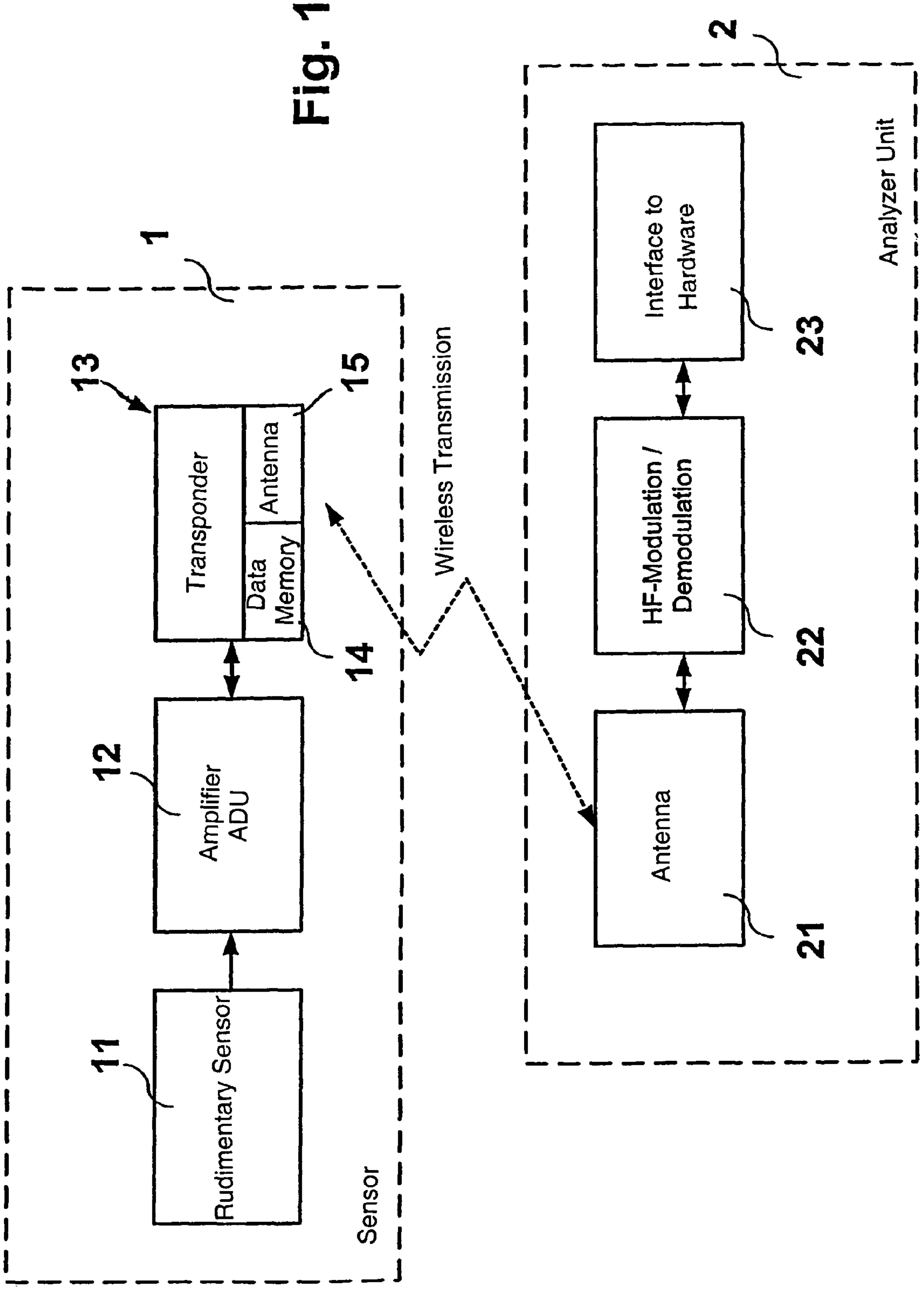
FIG. 1 a block diagram of a measurement system according to the invention.

FIG. 1 shows a block diagram of the measurement system according to this invention. This measurement system includes an analyzer unit 2, to which at least one sensor 1 is replaceably connected. The sensor 1 has the actual rudimentary sensor 11, which converts the physical variable to be measured into an electric signal, an electronic circuit 12 including, e.g., a preamplifier and an analog/digital converter in the case of an analog rudimentary sensor 11, and a transponder 13 with an integrated data memory 14 and with an antenna 15. The data memory 14 contains the sensor-specific data, already described as belonging to the related art in the description introduction, and also the measurement signal made available by the electronic circuit 12.

The analyzer unit 2 includes an antenna 21 for sending a query to the transponder, a respective high-frequency unit for modulating and/or demodulating the high-frequency signal and an interface 23 to further component of the overall device. These further components relate to features such as measured value processing, display, etc., and are not shown here because they are not essential to this invention, they are known in general and they may be implemented in a variety of different designs, depending on the physical variable to be measured.

In operation of the measurement system, the antenna 21 sends a high-frequency signal, which consists of a carrier frequency with an information signal modulated onto it, and induces a corresponding voltage in the antenna 15 of the transponder 13. This voltage supplies the electric power for the power supply to the transponder. The information signal contained in the modulation triggers a query of the data stored in the data memory of the transponder and an acknowledgment of this stored data to the antenna of the analyzer unit. This transmission mechanism to and from the transponder is conventional and therefore need not be explained here in detail.

In accordance with the invention, the transmission of the data stored in the data memory 14 of the transponder 13 is supplemented in that the measurement signal is automatically also transmitted to the analyzer unit 2. Since the electronic circuit 12 in the sensor 1 is constantly updating the area in the data memory 14 which contains the measured value, the value just updated is transmitted with each query of the data stored in the transponder.

The power pack in the transponder 13 must of course be designed with sufficient capacity such that it can also make available the electric power required to supply power to the electronic circuit 12. If the rudimentary sensor 11 also needs electric power for operation, then this capacity should also include the power to supply the sensor 11. To do so, the signal of the antenna 21 must of course be strong enough so that enough power is transmitted into the antenna of the transponder 13.

Figure 2:
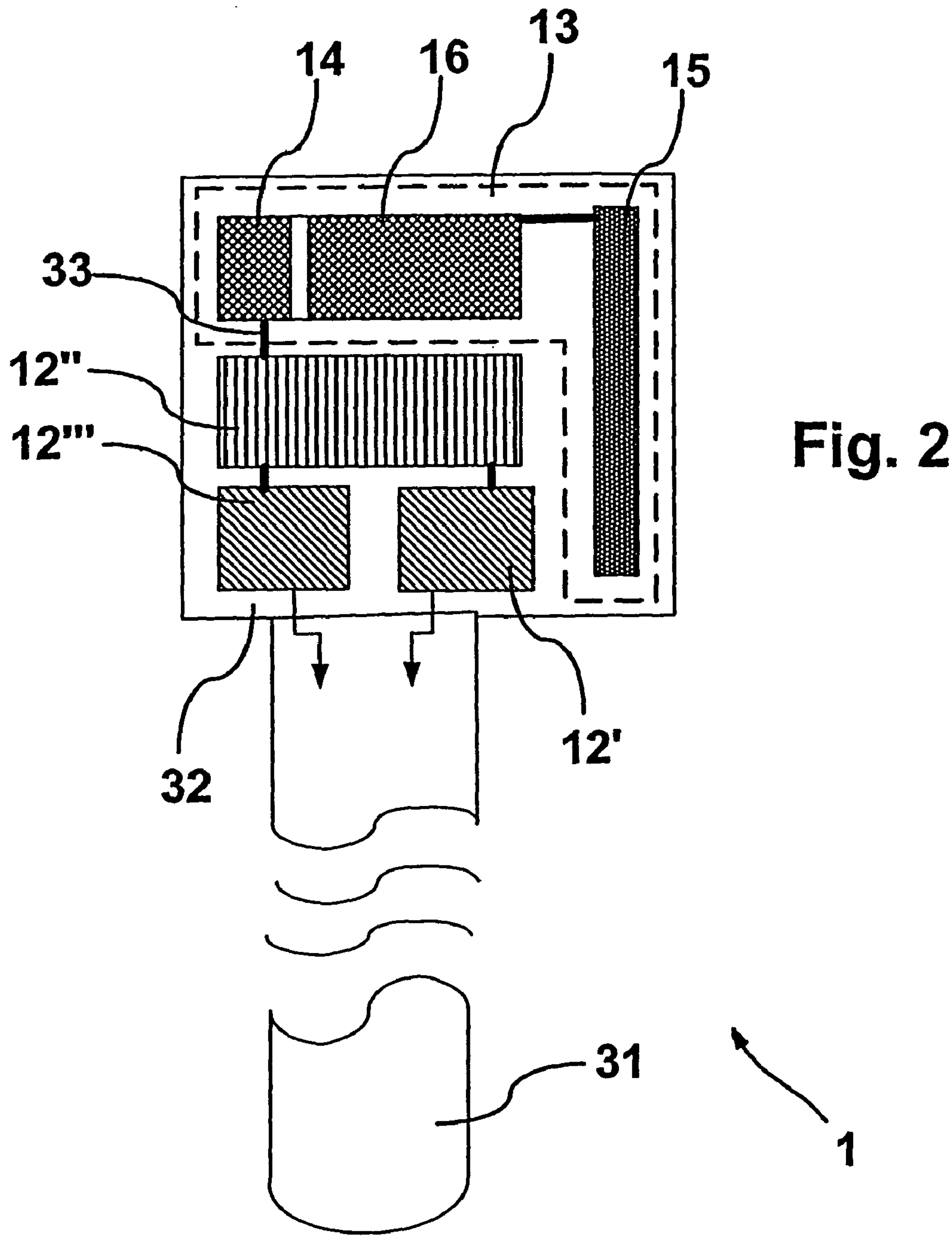
FIG. 2 the design of a pH sensor with a transponder, illustrating a first embodiment of the connection between the sensor and the analyzer unit.
Figure 3:
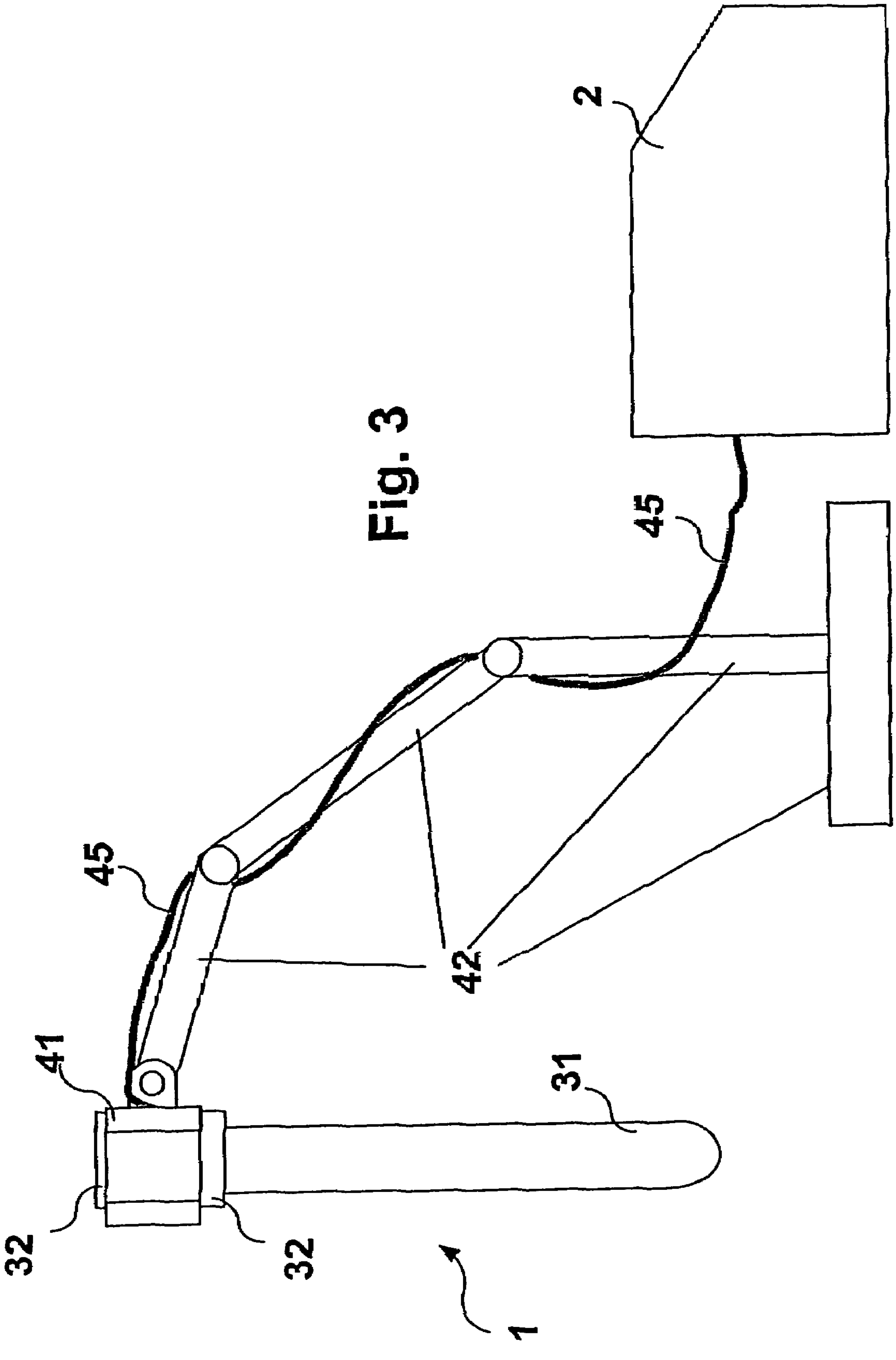
FIG. 3 a pH sensor in a stand clamp utilizing the invention.
Figure 4:
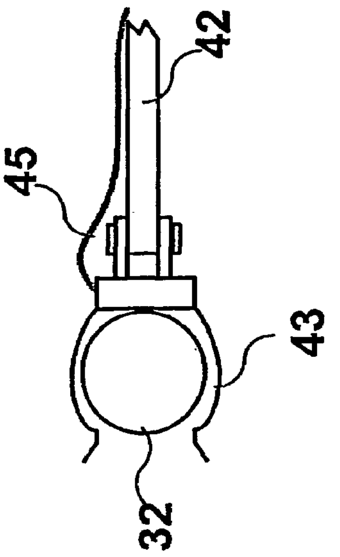
FIG. 4 a top view of the pH sensor from FIG. 3.

A specific embodiment will now be explained resorting to the example of a pH meter and with reference to FIGS. 2 through 6. FIG. 2 shows the design of the sensor; FIG. 3 shows the sensor and the analyzer unit, and FIGS. 4 through 6 show details of the sensor/analyzer unit connection.

The sensor 1 in FIG. 2 consists of a pH electrode, which is protected from mechanical damage by a glass tube 31, and a cylindrical connecting unit 32. This connecting unit is located in the axial extension of the glass tube 31 and contains in its interior the transponder 13 and the electronic circuit 12. The electronic circuit includes an analog preamplifier 12', which amplifies the weak, high-impedance signal of the pH electrode, and a microprocessor 12" having an integrated analog/digital converter. The analog/digital converter converts the analog signal at the output of the preamplifier 12' into a digital signal. The microprocessor controls the analog/digital converter and can perform any of a variety of computation operations with the measurement signal. For instance, FIG. 2 shows as an example the sensor 1 with a temperature sensor in the vicinity of the electrode, its output signal also being sent to the analog/digital converter and the microprocessor via a preamplifier 12'". Therefore, the microprocessor can eliminate a known temperature coefficient of the electrode through computation. A temperature-compensated digital output signal is thus available at the output 33 of the microprocessor and is stored in a predetermined area of the data memory 14 associated with the transponder 13, and is updated continuously. In the other areas of the data memory 14, other data—generally constant—are stored, e.g., an identification number, data about the calibration of the device, the time of the last calibration, etc. In addition, FIG. 2 also shows other parts of the transponder 13 separately: the antenna 15, a power pack/transmission and reception part 16 and the data memory 14, mentioned above.

In preparation for operation, the sensor 1 is inserted into a retaining clamp 41, which is secured on a stand 42, as shown in an overall view in FIG. 3. Details of the clamping device can be seen in FIGS. 4 through 6. In FIGS. 5 and 6, the sensor 1 is shown before insertion into the retaining clamp 41, and in FIGS. 3 and 4 the sensor is shown in the inserted state. FIGS. 3 and 5 show side views, while FIGS. 4 and 6 are top views. The retaining clamp 41 has two spring arms 43 which are able to yield in a resilient manner on insertion of the connecting unit 32 of the sensor 1—according to the arrow 44 in FIG. 6—and hold the connecting unit in the inserted position due to their spring force.

Figure 5:
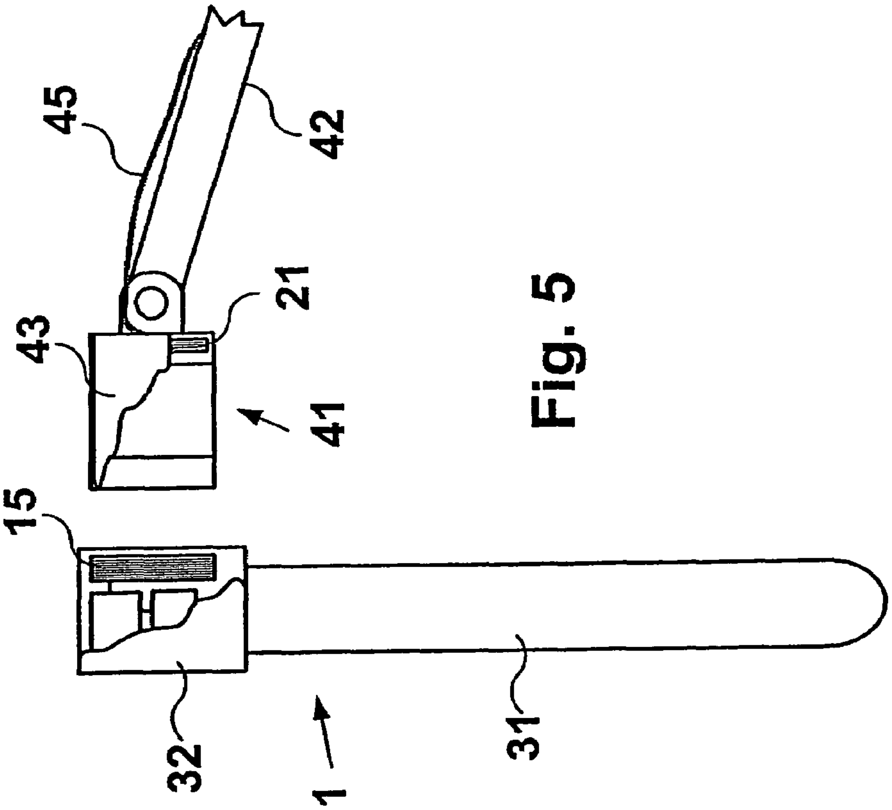
FIG. 5 a side view of the pH sensor from FIG. 3 before being clamped.
Figure 6:
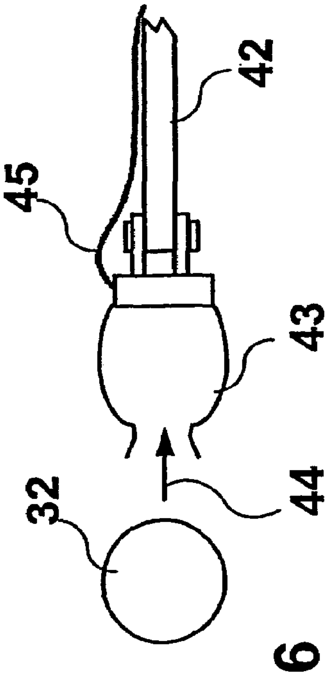
FIG. 6 a top view of the pH sensor from FIG. 5.

FIG. 5 also shows schematically the internal electronics, for further explaining the functioning of this system. The antenna 15 of the transponder is brought into the immediate proximity of the antenna 21 by insertion into the mounting clamp 41, thereby establishing the inductive coupling. The antenna 21 is connected by a cable 45 to the analyzer unit 2 (see FIG. 3). The cable 45 is fixedly connected to the analyzer unit 2 without a plug-and-socket connection. As such, the cable and the mounting clamp 41 together with the antenna 21 are thus part of the analyzer unit in terms of both hardware and function. The separation and/or connection between sensor 1 and analyzer unit 2 is/are accomplished between the connecting unit 32 on the sensor and the mounting clamp 41 with the antenna 21 as a mating component on the analyzer unit. This connection is established entirely without plug-and-socket connections, thereby avoiding all problems associated with connectors, such as poor insulation because of soiling, corrosion on the metal transitional areas, damage, etc. These connector problems are especially serious in the case of pH electrodes, because pH electrodes deliver a low signal voltage and also have a very high internal resistance.

Figure 7:
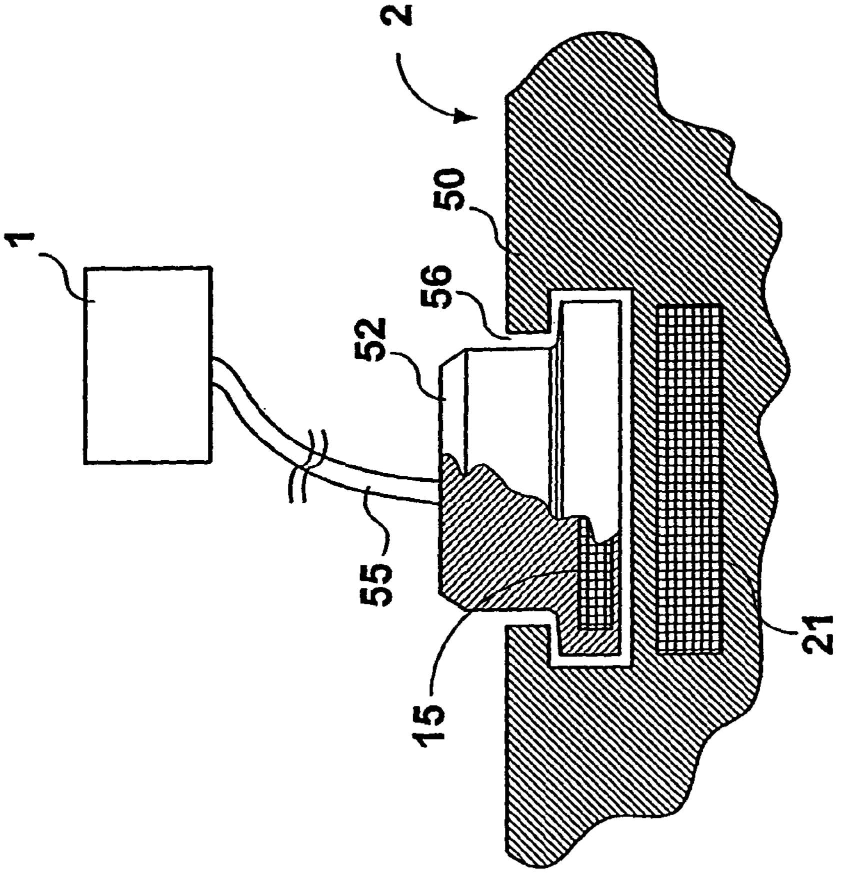
FIG. 7 a second embodiment of the connection between the sensor and the analyzer unit.
Figure 10:
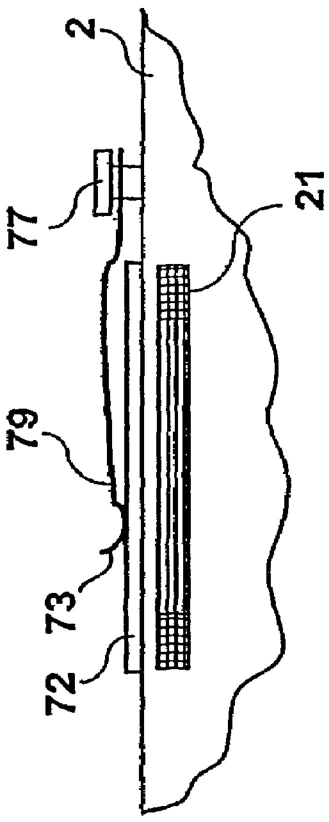
FIG. 10 a side view of the spring element from FIG. 9.

Alternative embodiments of the connection between the sensor 1 and the analyzer unit 2 are shown in FIGS. 7 through 10. In FIG. 7 the sensor 1 has a cable 55, which ends in a mushroom-shaped connecting unit 52. The transponder with its antenna 15 is located in the connecting unit 52. The electric circuit for signal shaping is situated in the sensor 1 or in the connecting unit 52 or in part in the sensor and in part in the connecting unit, depending on what is most expedient for the given measurement application. The connecting unit may be introduced from above into a suitably shaped slot 56 as a mating component in the wall 50 of the analyzer units (FIG. 7 shows a horizontal section) and is thus secured there. In this position, the antenna 15 of the transponder is situated exactly opposite the antenna 21 in the analyzer unit.

Figure 8:
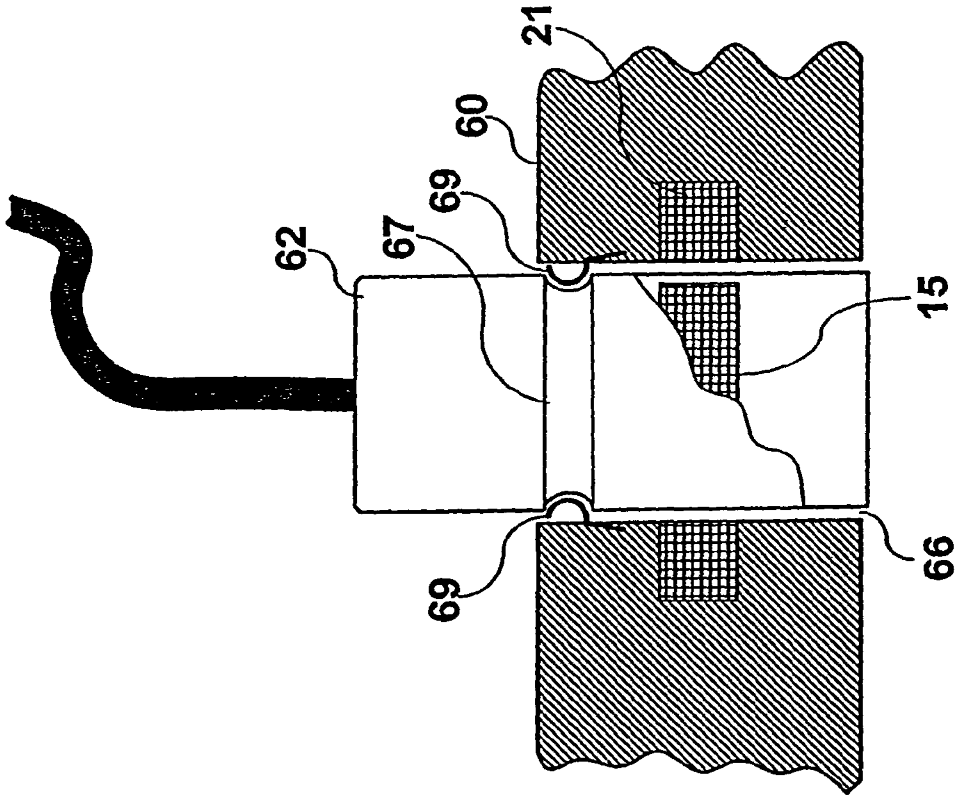
FIG. 8 a third embodiment of the connection between the sensor and the analyzer unit.

In the embodiment according to FIG. 8, the connecting unit 62 is designed as a cylinder. The antenna 15 is fashioned, correspondingly, as a cylindrical coil. The connecting unit 62 is inserted from above (FIG. 8 shows a vertical section) into a round opening 66 in the housing 60, where it engages (ring groove 67 and spring 69). Due to this locking engagement, the opening 66 may be open at the bottom, so that liquid penetrating from above can flow out at the bottom. In the locked position, the antenna 15 of the transponder is again exactly opposite the antenna 21 on the analyzer unit.

Figure 9:
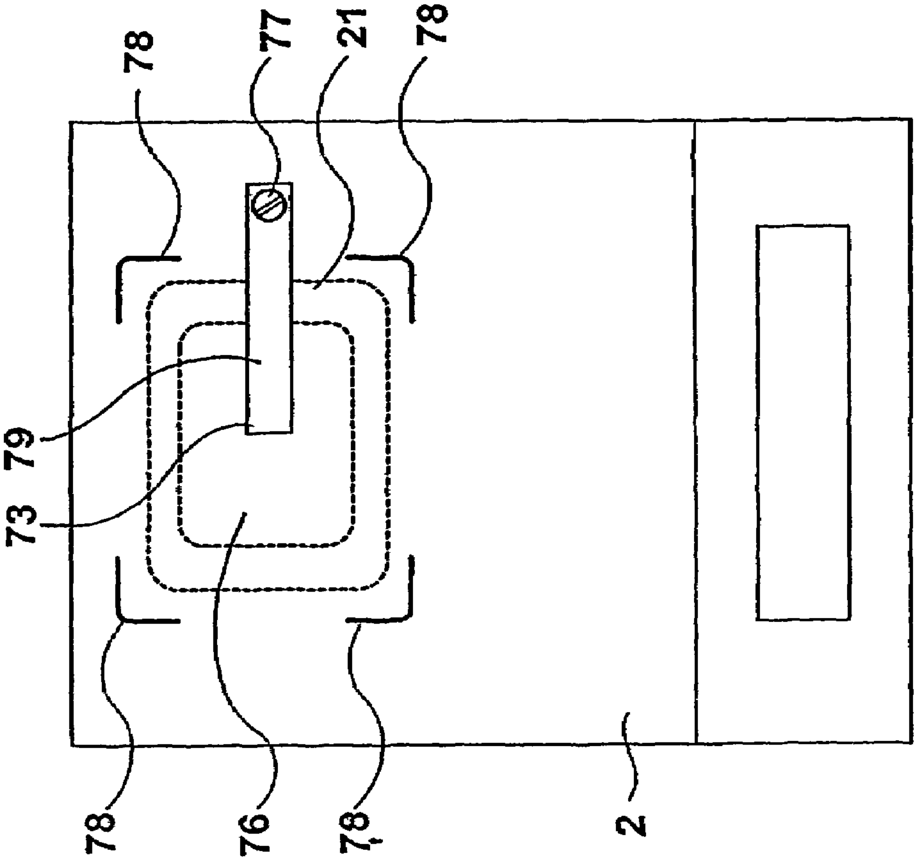
FIG. 9 a fourth embodiment of the connection between the sensor and the analyzer unit.

FIG. 9 shows a view of another embodiment of the analyzer unit 2. The mating component 76 to the receptacle of the connecting unit (not shown in FIG. 9) is marked only by four printed bordering corners 78. The antenna 21 situated beneath that is indicated with dotted lines. The connecting unit on the sensor is designed as a flat rectangular plate, for example, which is placed on the field 76 as a mating component. It is secured, e.g., magnetically or by a spring element 79. This spring mount is shown again in a side view in FIG. 10. The spring element 79 is secured at one end by a screw 77 on the housing of the analyzer unit, for example, and at the other end 73 it presses the plate-shaped connecting unit 72 against the top side of the analyzer unit.

Figure 11:
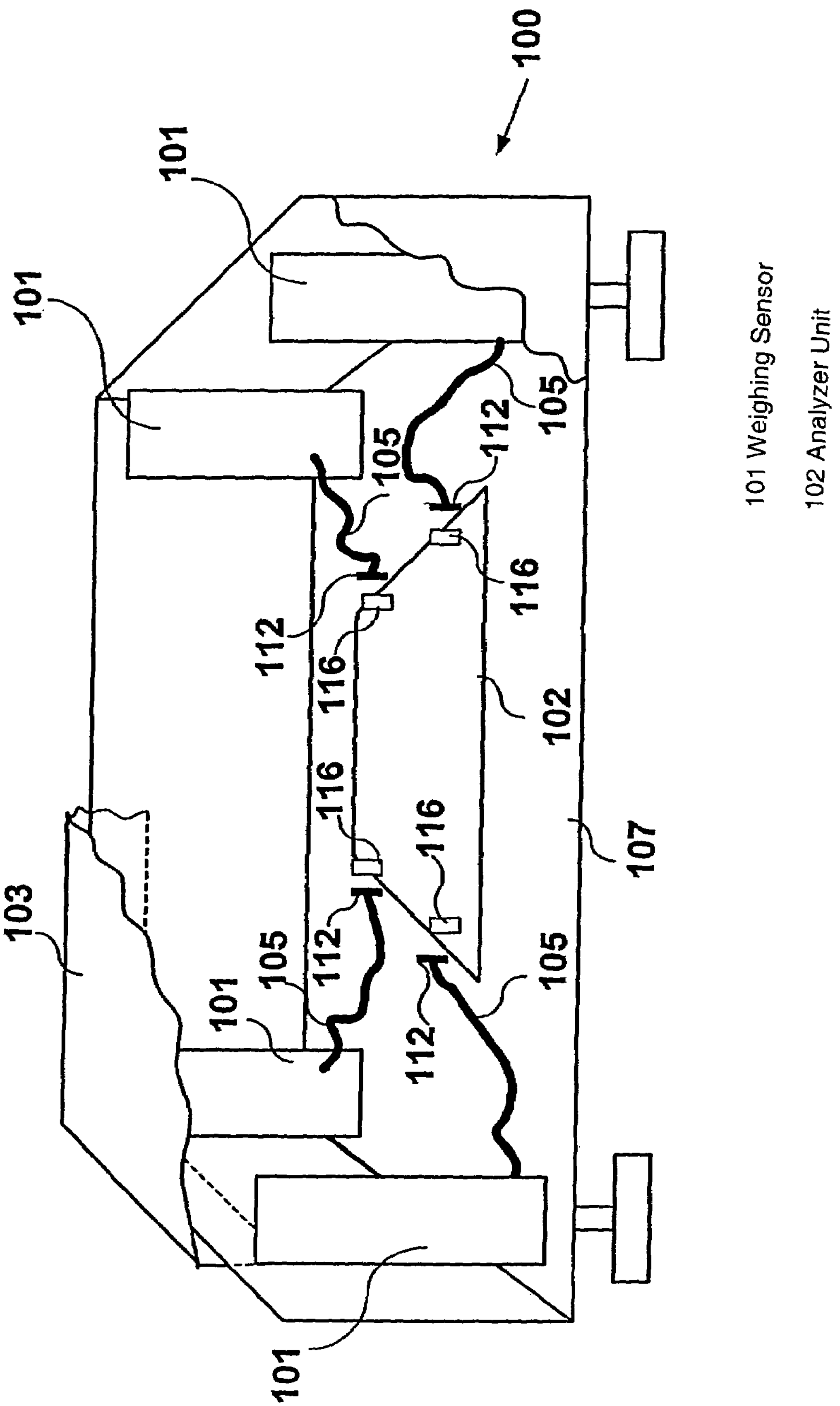
FIG. 11 scales having four weighing sensors, according to a further embodiment of the invention.

As a further exemplary embodiment of the invention, FIG. 11 shows scales 100 having a plurality of weighing sensors 101. Weighing sensors frequently operate with wire strain gauges in a known way as mechanical/electric converters which supply only a low output signal. Thus again in this exemplary embodiment, the plug-and-socket socket connections are a problem, especially when the high resolution, which is conventional with scales, is also included in the consideration. The scales in FIG. 11 consist of a housing 107 in which four weighing sensors 101 and one electronic analyzer unit 102 are accommodated. The weighing sensors carry the weighing dish 103. The design and function of scales having weighing sensors are conventional, so that the rough schematic diagram in FIG. 11 suffices and further details need not be more fully disclosed. The connection between the weighing sensors 101 and the electronic analyzer unit 102 is again accomplished by connecting units 112 having transponders, which are represented very schematically simply as lines in FIG. 11, in cooperation with corresponding mating components 116 on the housing of the electronic analyzer unit. Concrete embodiments of the connection are, e.g., shown in FIGS. 7 through 9.

The data memories of the transponders of the weighing sensors 101 contain, for example, an identification number, the maximum load, the resolution, the calibration validity date and similar data. The data are transmitted together with the measurement signals to the electronic analyzer unit 102, which analyzes the data. This prevents the wrong weighing sensor from being used as a substitute, e.g., during servicing.

In the closed interior of the scales 100, it is also possible for the antenna of the electronic analyzer unit to be so large and to receive such a high power that the antennas of the transponders in the connecting units must have a significant geometric distance from the antenna of the electronic analyzer unit. The transponders with their antennas may then be situated directly on the particular weighing sensor 101 without cables 105, and querying of all four transponders takes place through a single larger antenna in the electronic analyzer unit. The electronic analyzer unit should then be provided with software that renders it possible to differentiate the signals of the individual weighing sensors.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A measurement system comprising:

an analyzer unit; and at least one replaceable sensor, wherein each sensor comprises a transponder in which sensor-specific data is stored, wherein the analyzer unit comprises an antenna for wireless readout of the data stored in the transponder and for wireless transmission of power required to operate the transponder, wherein a measurement signal of the sensor is transmitted by wireless transmission via the transponder to the antenna of the analyzer unit, and wherein the transponder of the sensor is accommodated in a connecting unit, wherein the connecting unit is configured to be secured to a corresponding mating component of the analyzer unit, and wherein the antenna of the analyzer unit is situated in a vicinity of the mating component.

2. The measurement system as recited in claim 1, wherein the mating component comprises a stand clamp, which is connected by a cable to further components of the analyzer unit, and wherein the stand clamp is configured to secure the connecting unit of the sensor in a clamp connection.

3. The measurement system as recited in claim 1, wherein the mating component comprises a slot configured to slidingly receive the connecting unit from a insertion direction.

4. The measurement system as recited in claim 1, wherein the mating component comprises an opening configured to receive the connecting unit from a direction axial to the opening.

5. The measurement system as recited in claim 1, wherein the sensor further comprises an electronic circuit, which converts the measurement signal of the sensor for wireless transmission to the antenna of the analyzer unit.

6. The measurement system as recited in claim 5, wherein the electronic circuit converts the measurement signal of the sensor into a digital value and transmits this digital value to a memory of the transponder.

7. The measurement system as recited in claim 5, wherein the antenna of the analyzer unit also supplies power for operating the electronic circuit, which converts the measurement signal of the sensor.

8. The measurement system as recited in claim 1, wherein the connecting unit and the mating component comprise respective complementary surfaces.

9. The measurement system as recited in claim 8, wherein the respective complementary surfaces are flat.

10. The measurement system as recited in claim 8, wherein the connecting unit is held to the mating component by a compression spring.

11. The measurement system as recited in claim 8, wherein the connecting unit is held to the mating component by magnetic forces.

12. A measurement system comprising:

an analyzer unit; and at least two sensors, wherein each sensor comprises a transponder in which sensor-specific data is stored, wherein the analyzer unit comprises an antenna for wireless readout of the data stored in each of the transponders and for wireless transmission of power required to operate each of the transponders, wherein respective measurement signals of the sensors are transmitted by wireless transmission via the transponders to the antenna of the analyzer unit, wherein the analyzer unit additionally comprises electronics, including identification software, for differentiating the respective measurement signals of the sensors and for analyzing the differentiated measurement signals, and wherein the transponder of the sensor is accommodated in a connecting unit, wherein the connecting unit is configured to be secured to a corresponding mating component of the analyzer unit, and wherein the antenna of the analyzer unit is situated in a vicinity of the mating component.

* * * * *